US006460908B1

(12) United States Patent
Green

(10) Patent No.: US 6,460,908 B1
(45) Date of Patent: Oct. 8, 2002

(54) COLLAPSIBLE HOIST

(76) Inventor: Robert E. Green, 279 Rd. 102, Granite Canon, WY (US) 82059

( * ) Notice: Subject to any disclaimer, the term of this patent is extended or adjusted under 35 U.S.C. 154(b) by 0 days.

(21) Appl. No.: 09/768,532

(22) Filed: Jan. 23, 2001

(51) Int. Cl.[7] .............................................. B60R 19/48
(52) U.S. Cl. ........................ 293/117; 424/543; 212/180
(58) Field of Search .......................... 293/117; 414/543, 414/545, 559; 212/294, 180

(56) References Cited

U.S. PATENT DOCUMENTS

| | | | | |
|---|---|---|---|---|
| 4,419,038 A | * | 12/1983 | Pendergraft | 212/294 X |
| 4,746,263 A | * | 5/1988 | Cook | 293/117 X |
| 5,064,078 A | * | 11/1991 | Van Staveren | 212/180 |
| 5,439,343 A | * | 8/1995 | Watson | 212/180 |
| 5,540,537 A | * | 7/1996 | Welch | 212/180 |
| 6,042,328 A | * | 3/2000 | McVaugh | 212/180 |

FOREIGN PATENT DOCUMENTS

EP 0089614 A2 * 9/1983

OTHER PUBLICATIONS

Western Mule Cranes Web Site –http://www.westernmule.com/ Jun. 28, 2001.

* cited by examiner

Primary Examiner—Stephen T. Gordon
Assistant Examiner—Jason Morrow
(74) Attorney, Agent, or Firm—Rick Martin; Patent Law Offices of Rick Martin, P.C.

(57) ABSTRACT

A hoist is collapsible into a storage box which is preferably mounted in place of a rear bumper on a pickup truck. The hoist has a tubular base which houses the swing arm of the hoist in the collapsed mode. The base of the storage box is reinforced to support the forces of the hoist and allow it to rotate 360 degrees.

14 Claims, 11 Drawing Sheets

COLLAPSIBLE HOIST

FIELD OF THE INVENTION

The present invention relates to a manually operated hoist which traditionally is mounted in the bed of a pickup truck. The collapsible hoist tears down into a composite of parts which fit into a storage box, wherein the storage box can be mounted on a pickup truck to replace the rear bumper.

BACKGROUND OF THE INVENTION

Space in the bed of a pickup truck is a valuable commodity. The same holds true for work space on any work vehicle including a flat bed truck.

Hoists for winching up items such as engine blocks are commonly mounted on the bed of the pickup truck or like vehicle. The permanent hoist takes up valuable work space on the truck while the truck is being used for other purposes.

The present invention solves this problem by providing a collapsible hoist that stores in a metal box that is mounted where the rear bumper normally resides.

The metal box also provides the base for the hoist in operation. Therefore, the pickup truck can be fully loaded while the hoist is operated.

SUMMARY OF THE INVENTION

The main aspect of the present invention is to provide a combination storage box and hoist mounting platform at the rear of a truck.

Another aspect of the present invention is to provide a collapsible hoist for mounting and storing in the storage box.

Another aspect of the present invention is to provide a telescoping hinge arm for space saving ease of storage.

Other aspects of this invention will appear from the following description and appended claims, reference being made to the accompanying drawings forming a part of this specification wherein like reference characters designate corresponding parts in the several views.

In the field a pickup truck has its rear bumper removed. In its place is mounted a metal storage box having a reinforced bottom which serves as a base for a hoist. The two arms of the hoist telescope during storage in the box. In use the base of the hoist pivots 360 degrees.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF DRAWINGS

Figure 1:
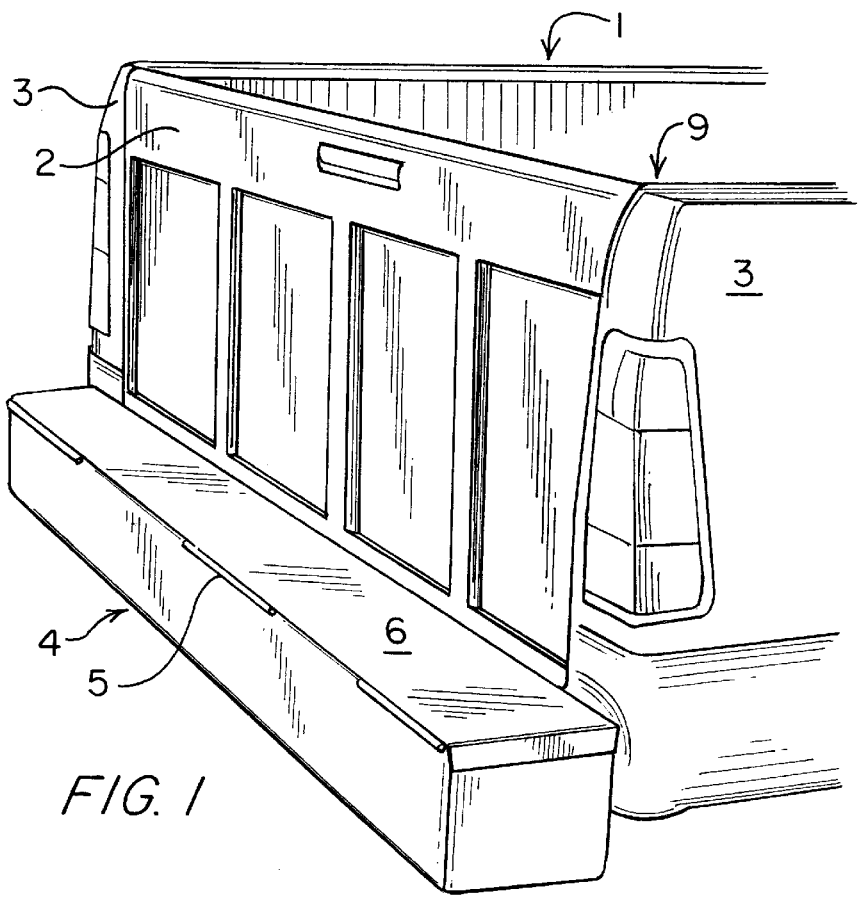
FIG. 1 is a top perspective view of an alternate embodiment storage box mounted in place of the rear bumper of a pickup truck.
Figure 2:
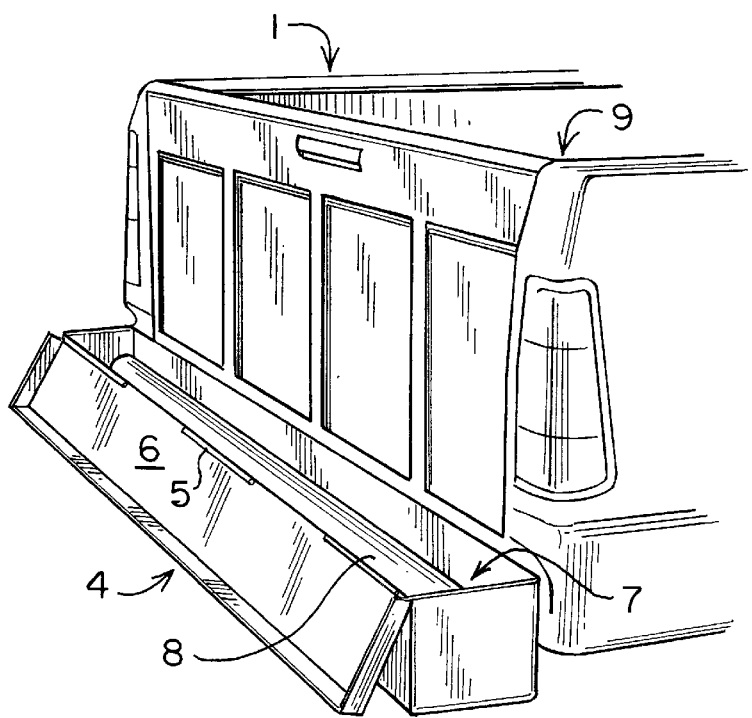
FIG. 2 is the same view as FIG. 1 with the top open.

Referring first to FIGS. 1,2 a pickup truck 1 has rear fenders 3, a tailgate 2 and a bed 9. In the prior art a hoist would be installed on the bed 9 which would take up valuable cargo area. The rear bumper has been replaced with a metal storage box 4 which has been welded and/or bolted onto the frame (not shown). Hinges 5 allow the top 6 to open (FIG. 2) and close (FIG. 1). A hoist 8 is shown in the collapsed mode and stored horizontally in the bay 7 of the storage box 4.

Figure 3:
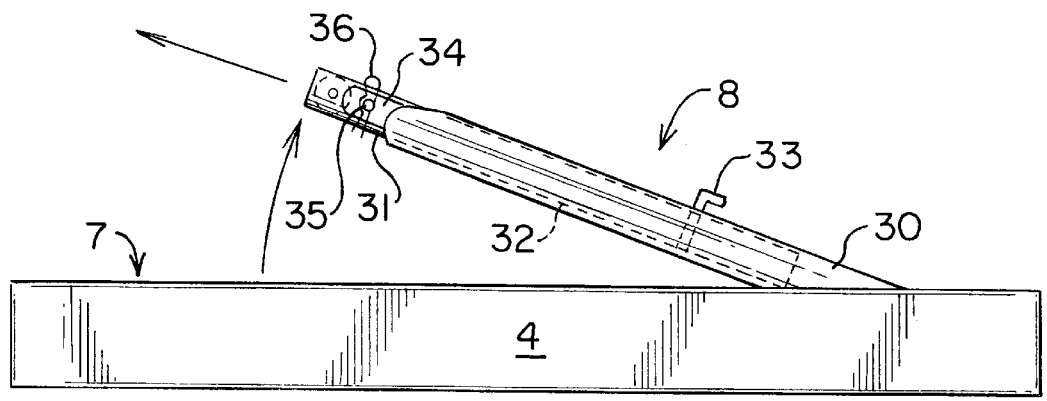
FIG. 3 is a rear plan view from behind the pickup, of the alternate embodiment with the base of the hoist partially raised from the storage box.
Figure 4:
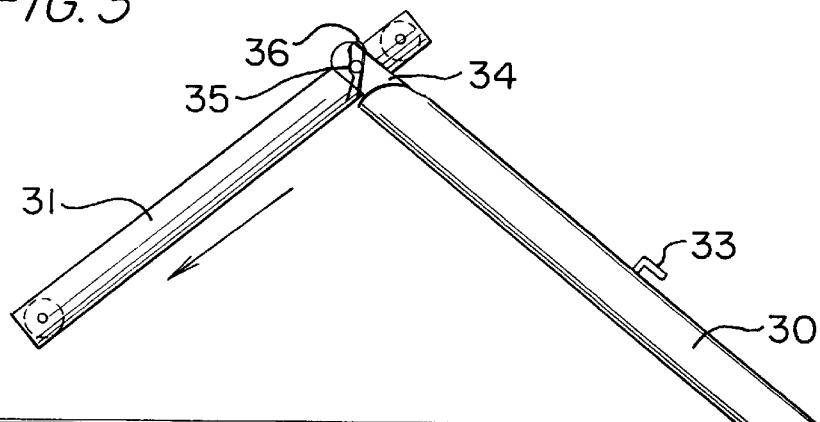
FIG. 4 is the same view as FIG. 3 with the upper arm of the hoist pulled out of the base and attached to the base of the hoist.
Figure 5:
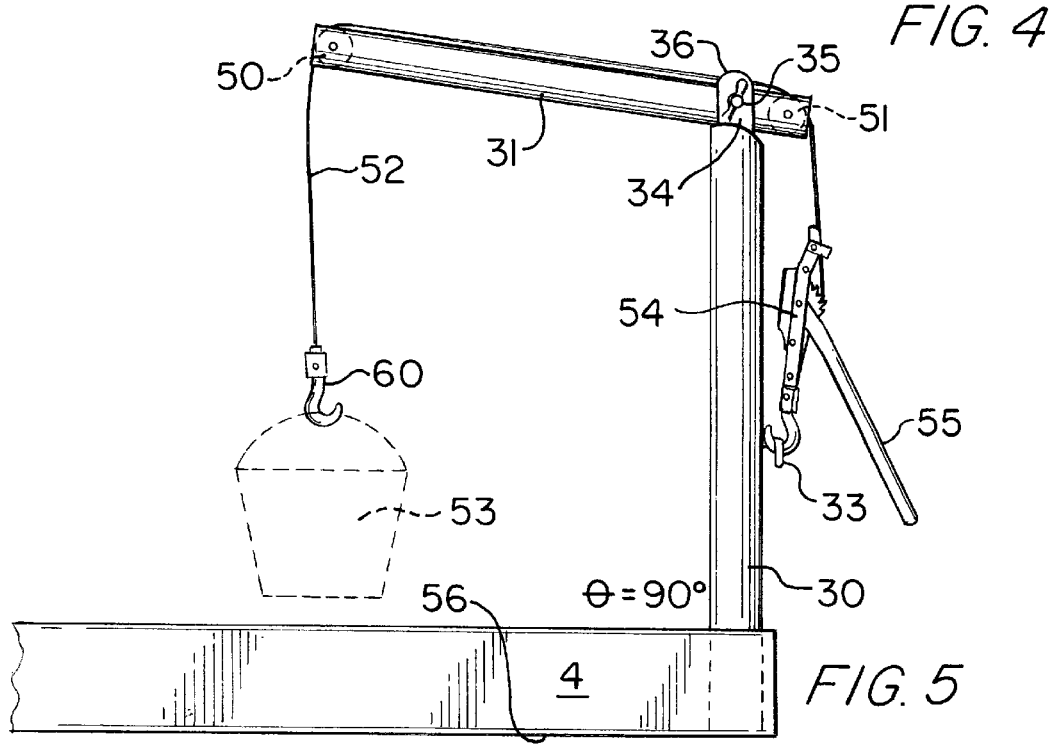
FIG. 5 is the same view as FIGS. 3,4 with the hoist fully assembled and operational.

Referring next to FIGS. 3,4,5 the hoist 8 is being placed into operational mode as shown in FIG. 5. In FIG. 5 angle ø is 90 degrees between the bottom 56 of the storage box 4 and the support post 30 of the hoist 8. The swing arm 31 of the hoist 8 has been secured between flanges 34 of the support post 30 with a bolt 35 and a cotter pin 36. The pulleys 50,51 support the cable 52 which is lifting the load 53 via a hook 60. An anchor, a bolt, 33 has secured the base of a standard winch 54 which has a handle 55.

In the collapsed mode the swing arm 31 telescopes inside the support post 30 as shown by dotted lines 32 in FIG. 3. Either or both of the bolts 35 and 33 may serve to secure the swing arm 31 inside the support post 30 in the collapsed mode via holes (not shown) in the swing arm 31.

FIG. 3 shows the support post 30 partially raised from the bay 7 with the swing arm 31 still inside the support post 30. FIG. 4 shows the swing arm 31 out of the support post 30 and mounted between flanges 34 atop the support post 30.

Figure 6:
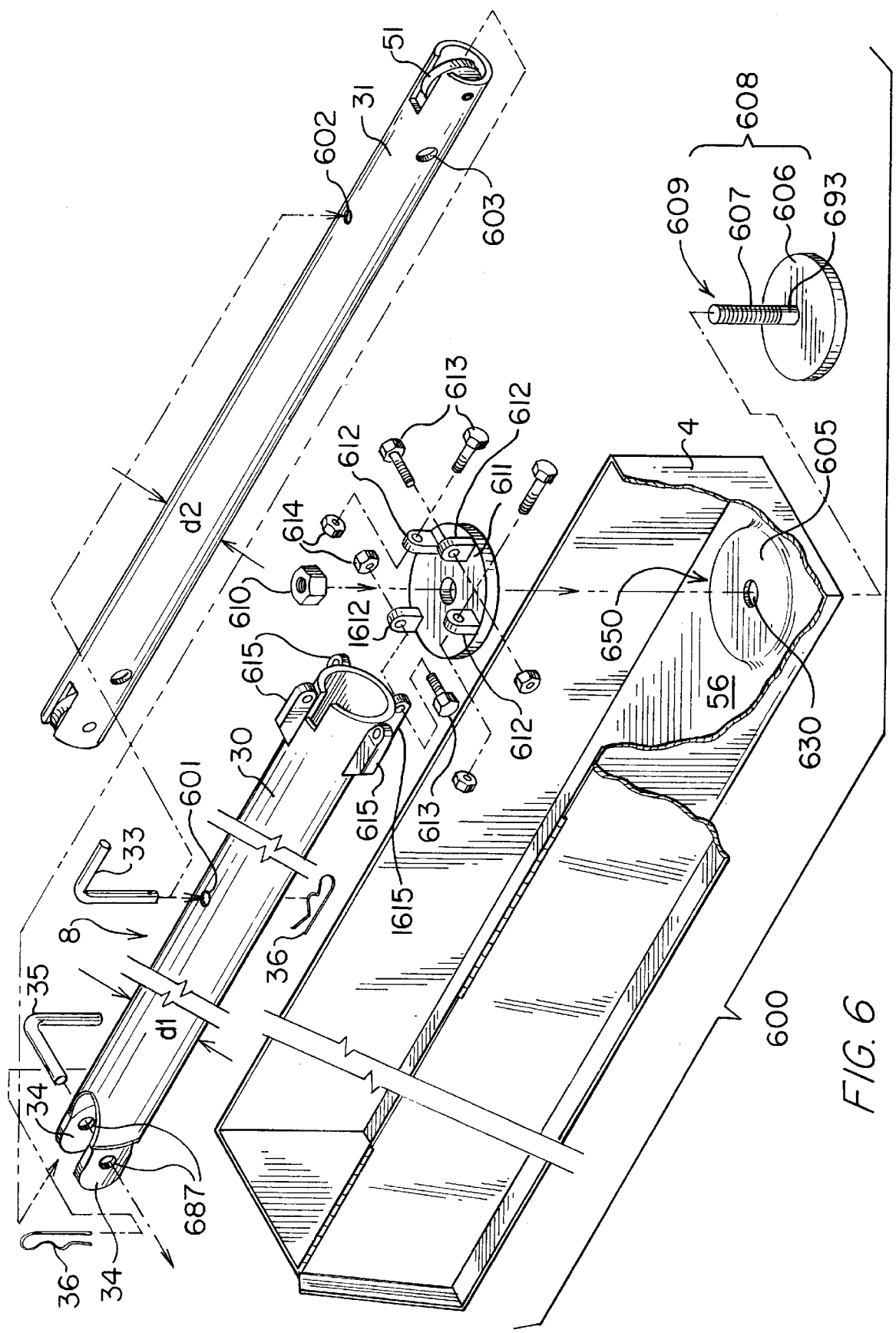
FIG. 6 is an exposed view of the alternate embodiment in the collapsed mode.

Referring next to FIG. 6 the storage box and hoist apparatus 600 shows the reinforced bottom segment 650 of the bottom 56. A metal disc 605 has been welded to the bottom 56. The hole 630 receives an anchor 608. The anchor 608 comprises a second reinforcing disc 606 and a bolt 607 having threads 609. A nut 610 secures the support stand 611 to the reinforced bottom segment 650.

The support stand 611 has four upright flanges 612,612, 612, and 1612, wherein flange 1612 provides a pivot with its bolt 613 and nut 614 for the leg 1615 of the hoist base 30 in the collapsed mode. The other three bolt 613 and nut 614 pairs are disassembled in the collapsed mode. All bolts 613 and nuts 614 are tightened in the operational mode. Legs 615,1615 are all alike.

The anchor 33 passes through holes 601,602 and is secured by cotter pin 36. A second hole 601 is not shown on the underside of base 30. Width $d_1 > d_2$. Bolt 35 passes through holes 687 and 603 in the operational mode. The non-threaded base 693 of bolt 607 stops the nut 610 from binding the support stand 611 against the disc 605.

Figure 7:
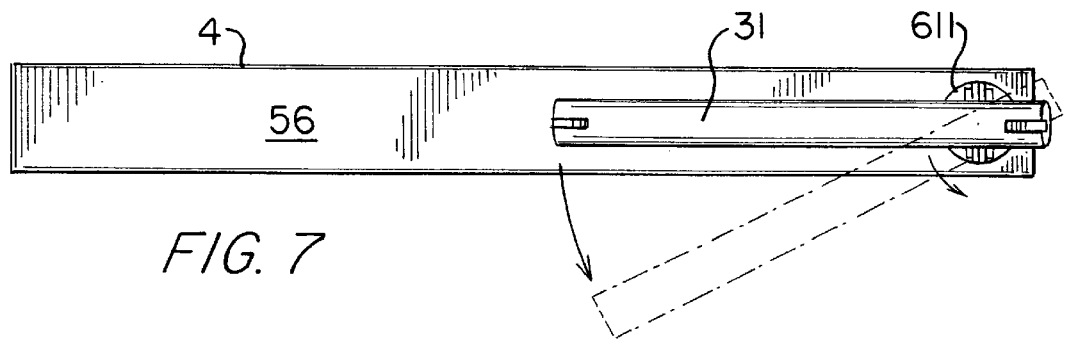
FIG. 7 is a top plan view of the assembled hoist shown capable of rotating 360 degrees.

FIG. 7 shows how the support stand 611 rotates 360 degrees to allow positioning of swing arm 31, as shown by dotted lines.

Figure 8:
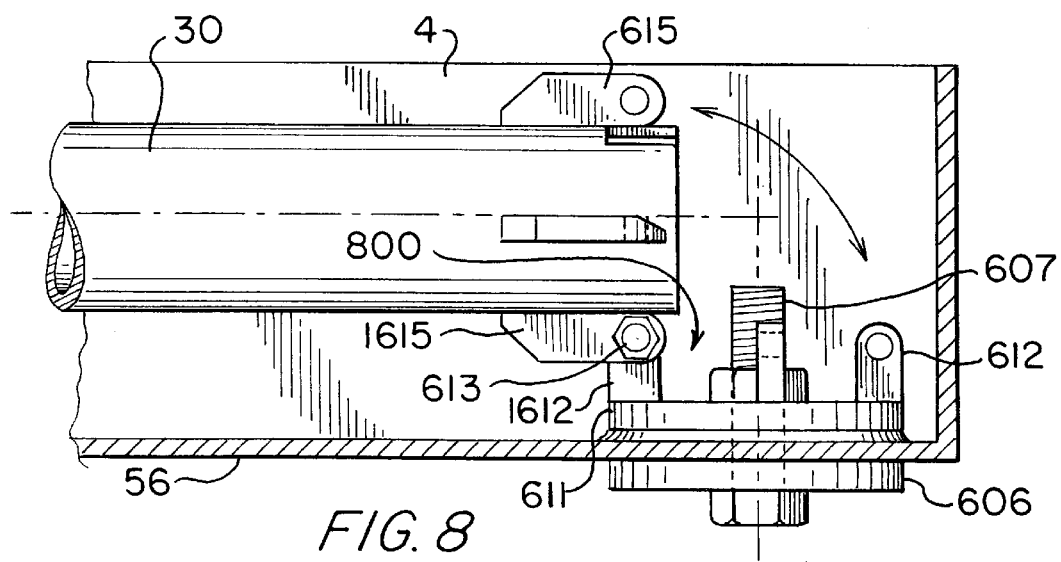
FIG. 8 is a rear view with a cutaway of the storage box showing how the base of the hoist pivots onto the reinforced bottom of the storage box.

FIG. 8 the detail of the collapsed mode pivot support 800 is shown. Leg 1615 pivots around flange 1612.

Figure 9:
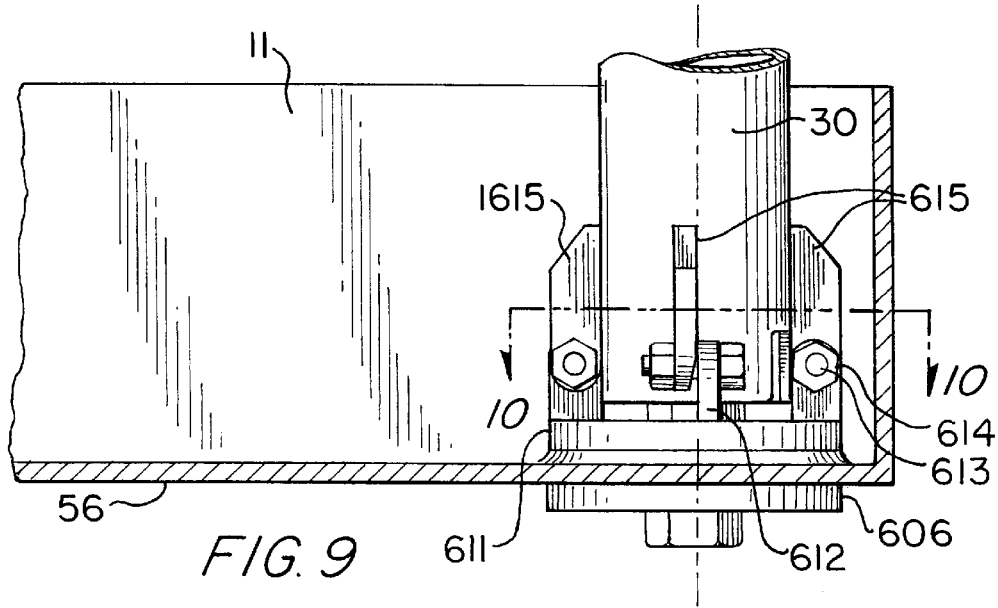
FIG. 9 is the same view as FIG. 8 with the base of the hoist secured in operational mode to the reinforced bottom of the storage box.

In FIG. 9 a gap G may exist between the bottom base 30 and the top surface of support stand 611. A design choice could eliminate the gap G.

Figure 10:
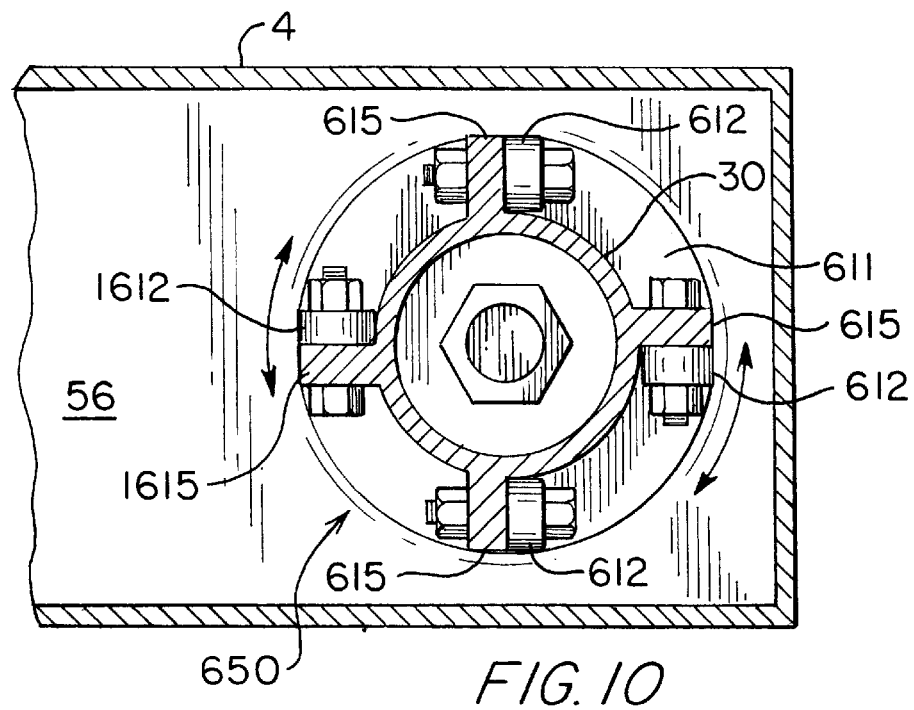
FIG. 10 is a sectional view taken along line 10—10 of FIG. 9 showing the 360 degree rotational capability of the base of the joist.

FIG. 10 shows the 360 degree rotation of support stand 611 over the reinforced bottom segment 650.

Figure 11:
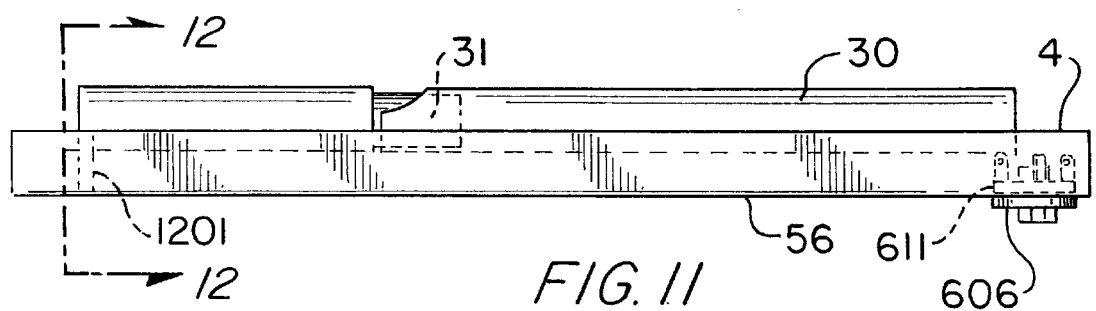
FIG. 11 is a rear plan view of the alternate embodiment with the top of the storage box removed, the base of the hoist in the hoist in the collapsed mode.
Figure 12:
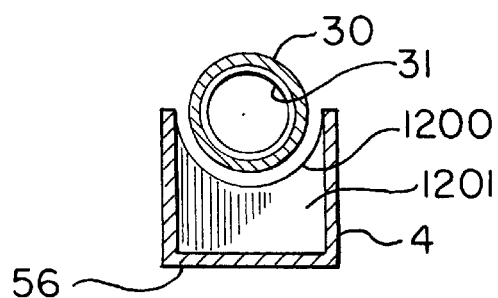
FIG. 12 is a cross sectional view taken along line 12—12 of FIG. 11.

Referring next to FIGS. 11,12 an optional support bracket 1201 has a concave upper surface 1200 to support the collapsed mode hoist assembly as shown.

Figure 13:
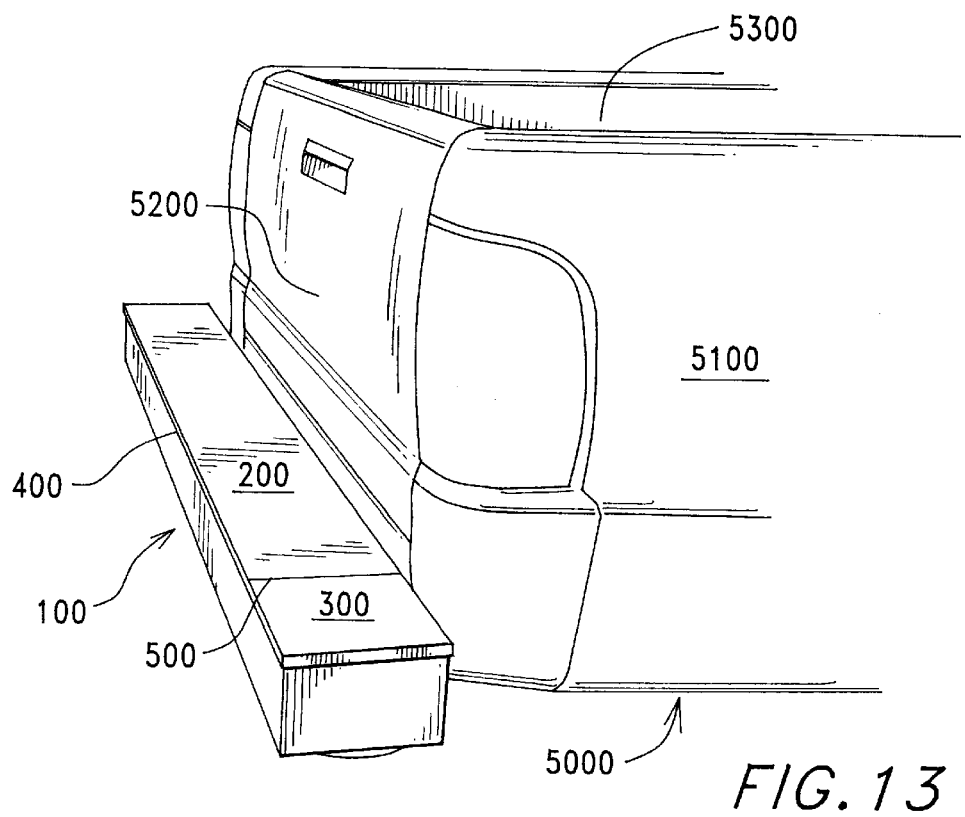
FIG. 13 is a top perspective view of the preferred embodiment collapsible hoist installed in place the rear bumper on a pickup truck.
Figure 14:
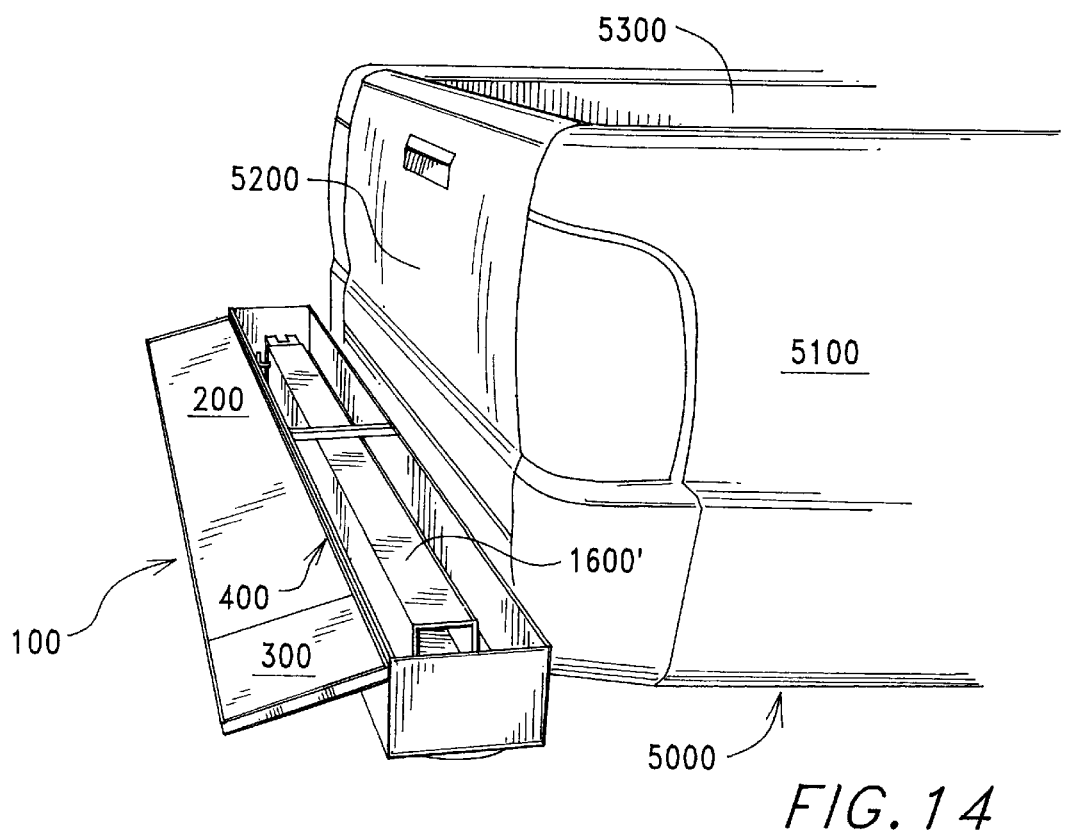
FIG. 14 is the same view as FIG. 13 with the top door opened.

Referring next to FIGS. 13,14 a pickup truck 5000 has a rear fender 5100, a tailgate 5200 and a bed 5300. In the prior art a hoist would be installed on the bed 5300 which would take up valuable cargo area. The rear bumper has been replaced with a metal storage box 100 which has been welded and/or bolted onto the frame (not shown). Hinges 4 allow the 200,300 to open (FIG. 14) and close (FIG. 13). A hoist 1600 is shown in the collapsed mode and stored horizontally in the interior of the storage box 1000.

Figure 15:
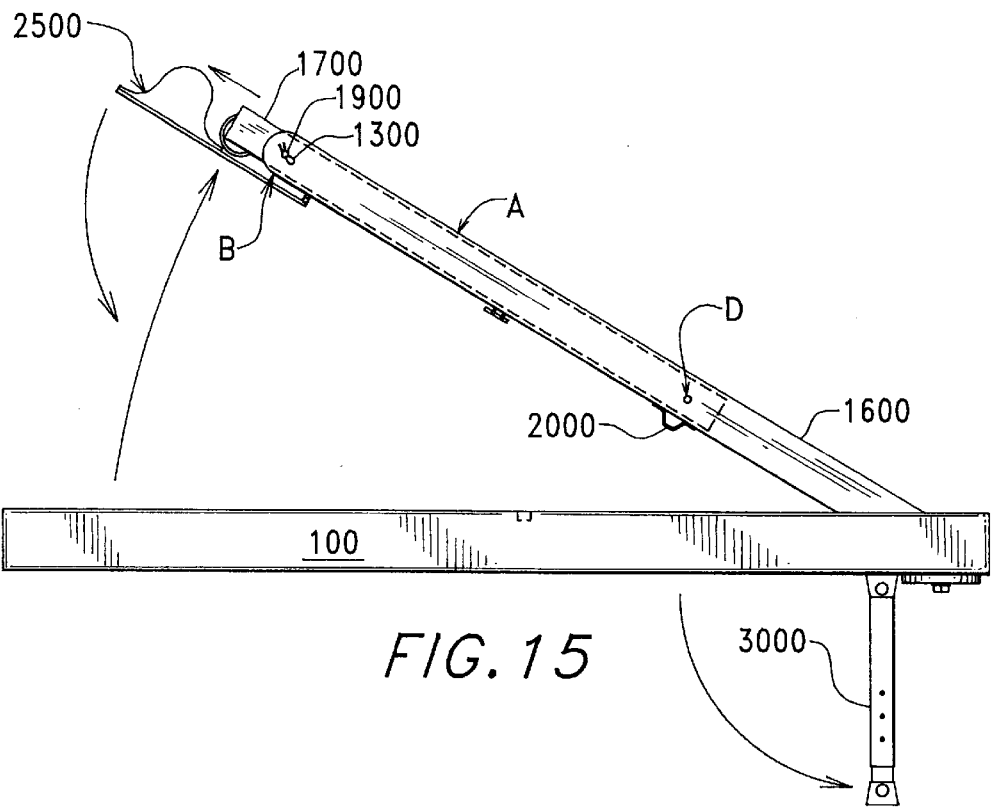
FIG. 15 is a rear plan view of the preferred embodiment shown partially erected.
Figure 16:
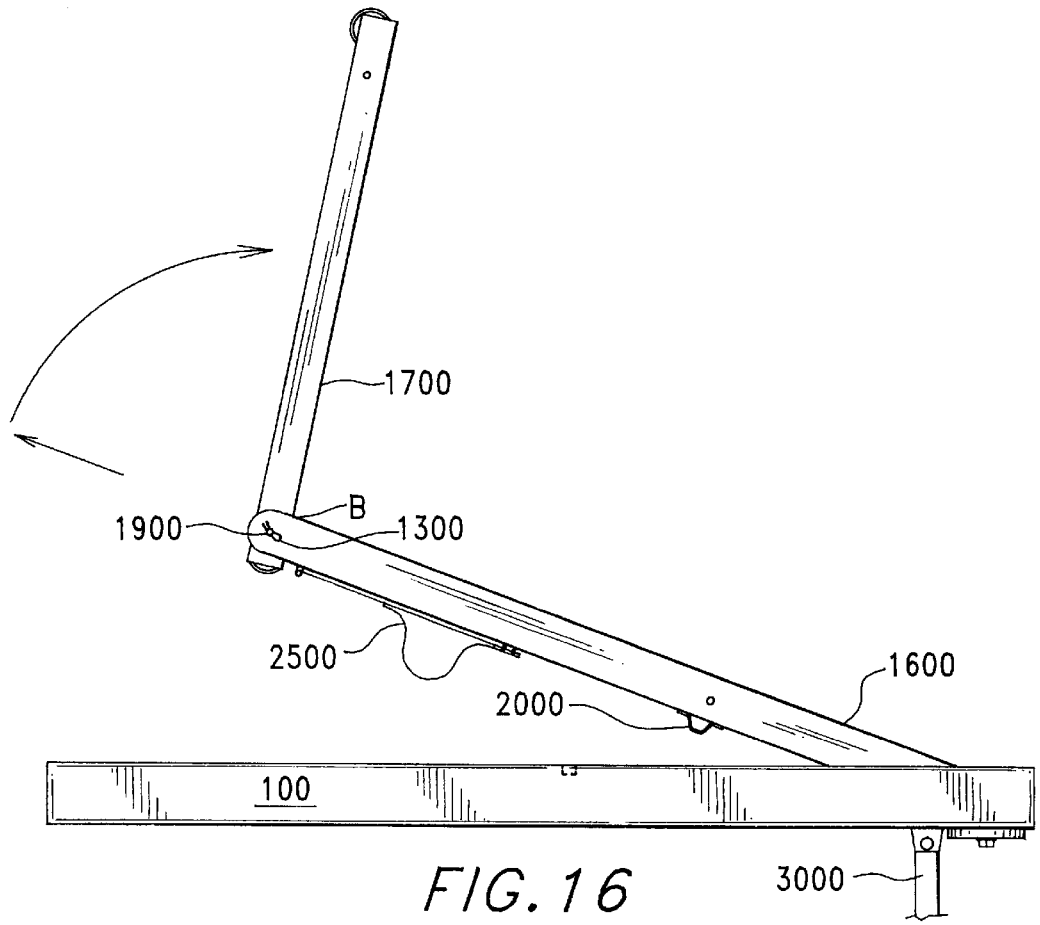
FIG. 16 is the same view as FIG. 15 with the hoist shown in a further state of erection.
Figure 17:
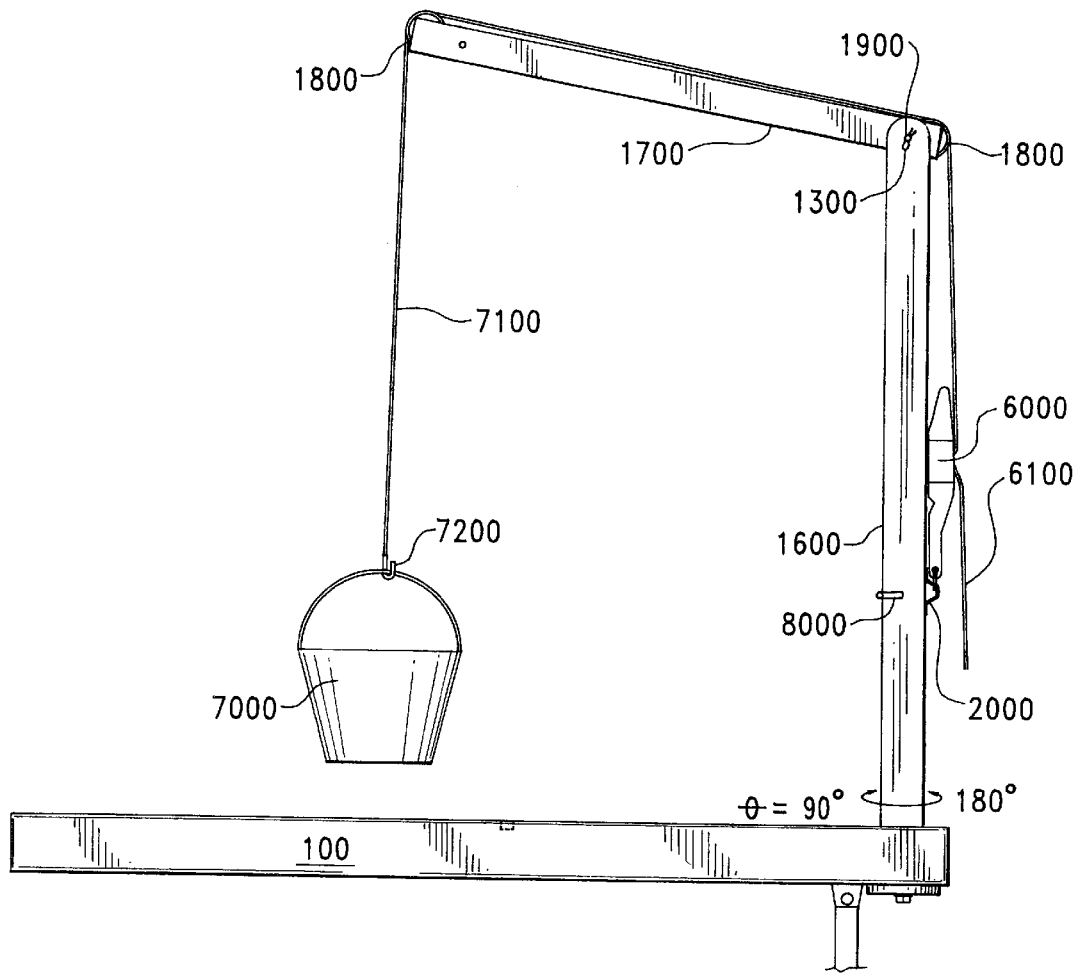
FIG. 17 is the same view as FIG. 16 with the hoist shown fully erected.
Figure 18:
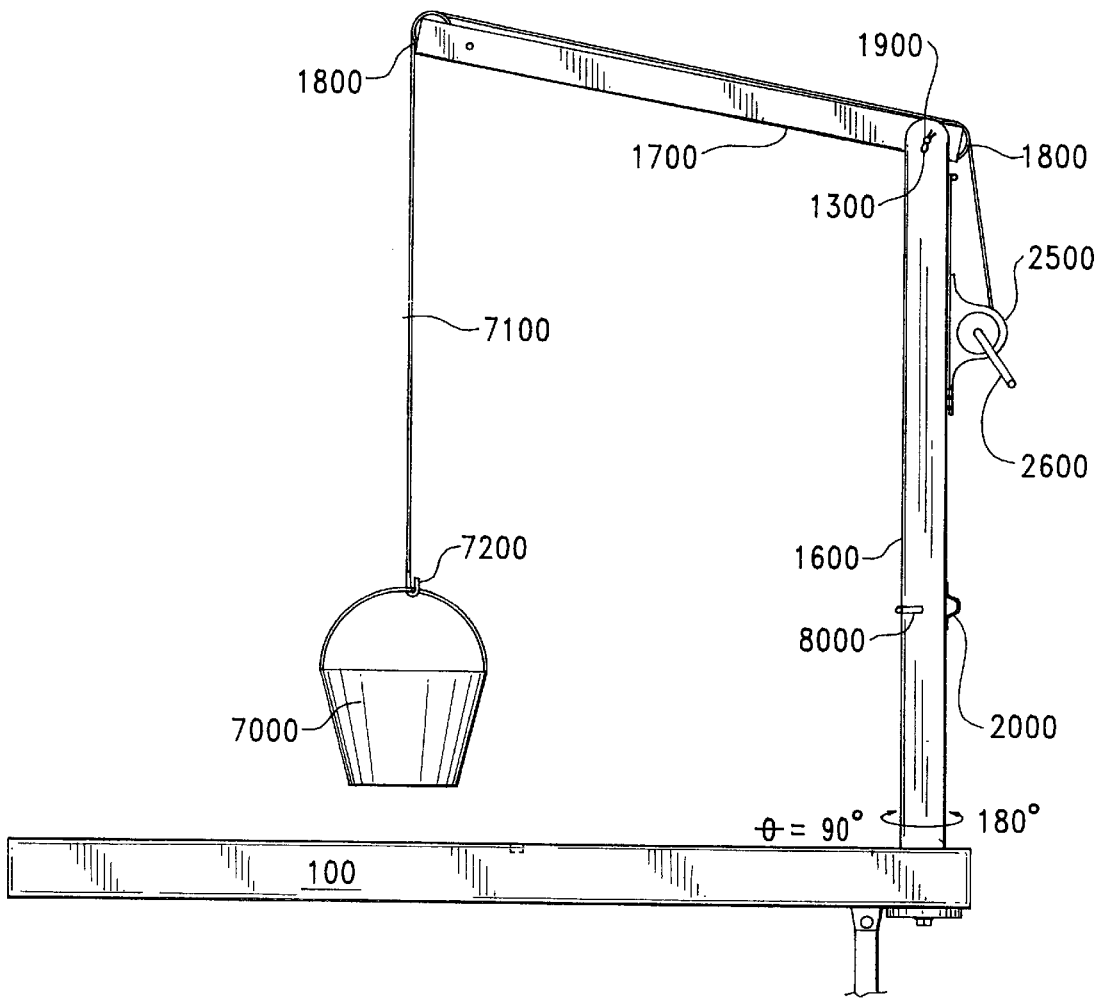
FIG. 18 is the same view as FIG. 17, wherein a winch is used instead of a come-along.

Referring next to FIGS. 15,16,17,18 the hoist 1600 is being placed into operational mode as shown in FIGS. 17,18. In FIGS. 17,18 an angle ø is 90 degrees between the bottom of the storage box 1000 and support post arm 1600 of the hoist assembly. The swing arm 1700 of the hoist assembly has been secured between flanges B of the support post arm 1600 with a bolt 1900 and a cotter pin 1300. In FIG. 17 pulleys 1800 support the cable 7100 which is lifting the load 7000 via a hook. A welding loop 2000 has secured the base of a standard winch 6000 which has a handle 6100. In FIG. 18 pulleys 1800 support the cable 7100 which is lifting the load 7000 via a hook 7200. A mounted winch 2500 is secured permanently with a hinging device for collapsing (FIG. 15) and lock for operational use (FIG. 16) with removable handle 2600.

In the collapsed mode the swing arm 1700 telescopes inside the support arm 1600 as shown by dotted lines A in FIG. 15. Bolt 1900 is to be used to secure the swing arm 1700 inside the support post arm 1600 in the collapsed mode via a hole D in the swing arm 1700.

FIG. 15 shows the support post arm 1600 partially raised from the bay of metal storage box 100 with the swing arm 1700 still inside the support post arm 1600. FIG. 16 shows the swing arm 1700 out of the support post arm 1600 and mounted between flanges B atop the support post arm 1600. The drop leg 3000 prevents the rear of the truck from sagging under load 7000. It is adjustable in length with a telescoping design and is hinged to bold up under the storage box when not in use.

Figure 19:
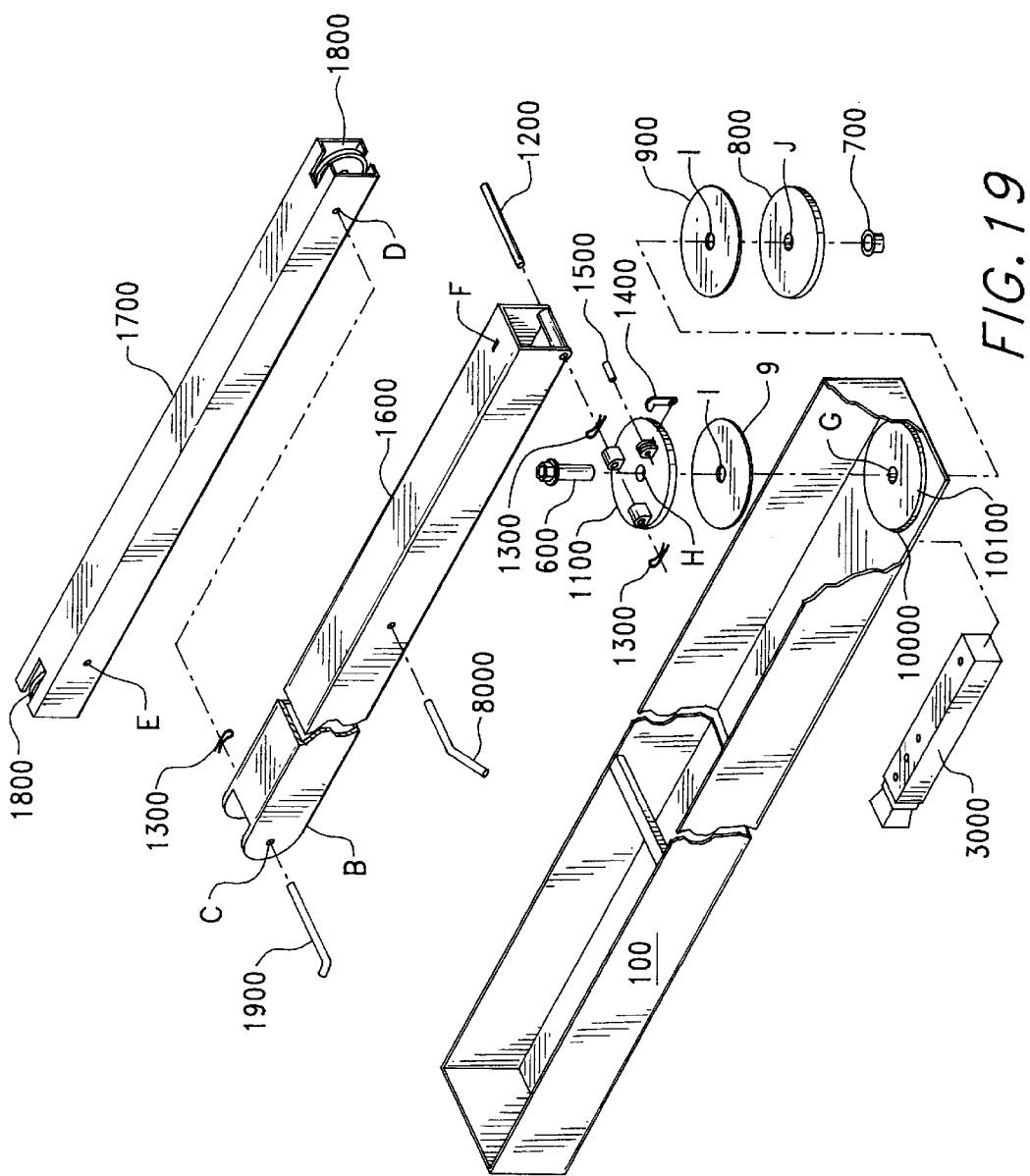
FIG. 19 is an exploded view of the preferred embodiment.

Referring next to FIG. 19 the storage box and hoist apparatus shows the reinforced bottom segment 1000 of the bottom storage box 100. A metal disc 101 has been welded to the bottom of the storage box 100. The bolt 600 passes through hole H in spindle plate 1100, hole I in the first disc 900, hole G in storage box 100, hole I in the second disc 900, through hole J in plate 800, secured by nut 700.

Figure 21:
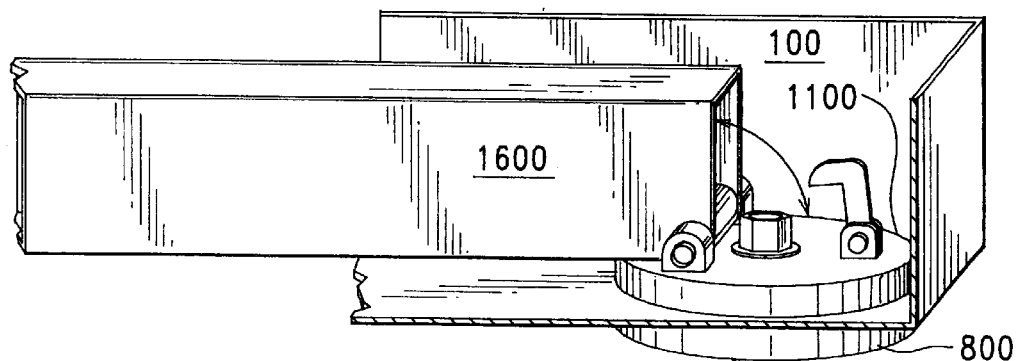
FIG. 21 is a rear perspective cutaway view of the hoist base lock assembly.
Figure 22:
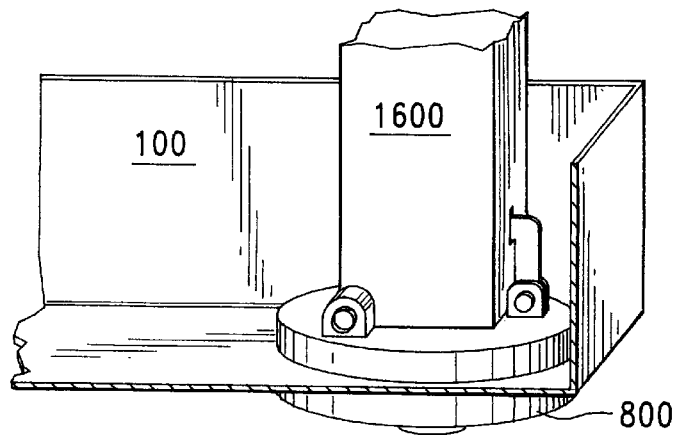
FIG. 22 is the same view as FIG. 21 with the hoist base locked in the upright position.

The spindle plate 1100 has two pivot legs that allow the support post arm 1600 and bolt 1200 to rotate from collapsed mode FIG. 21 to operational mode FIGS. 17,22.

Figure 20:
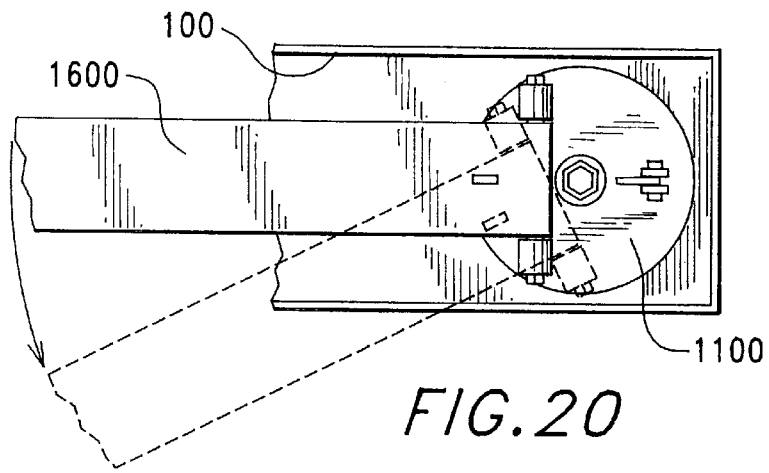
FIG. 20 is a top plan view of the joist base shown rotating.

FIG. 20 shows how the spindle plate 1100 rotates 360 degrees to allow positioning of swing arm 1700, as shown by the dotted lines.

FIG. 21 shows the detail of the spindle plate 1100 pivot legs in the collapsed mode.

FIG. 22 shows the detail of the support post 1600 in operational mode with spring lock 1400 engaged.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A combination storage box and hoist apparatus, said apparatus comprising:
    a storage box having a support stand for a hoist base;
    said storage box having a mount for connecting to a vehicle frame, wherein a rear bumper is replaceable with the storage box;
    wherein the storage box has a bottom which supports the support stand;
    a collapsible hoist having the hoist base connectable to the support stand;
    wherein the support stand further comprises a flange having a connection to a leg on the hoist base;
    said collapsible hoist having a collapsed mode size which fits inside the collapsible hoist; and
    wherein the support stand further comprises a rotating mount to the bottom.

2. The apparatus of claim 1, wherein the bottom has a reinforced segment which supports the support stand.

3. The apparatus of claim 1, wherein the connection is a pivot joint to enable a folding down of the base into the storage box.

4. The apparatus of claim 1, wherein the collapsible hoist further comprises a swing arm that stores inside the hoist base in a collapsed mode.

5. A collapsible hoist comprising:
    a storage box attachable to a rear of a vehicle in place of a rear bumper;
    said storage box having a support for a hoist;
    said hoist having a collapsed mode, wherein the hoist fits inside the storage box; and
    wherein the hoist further comprises a swing arm storable inside a hoist base in the collapsed mode.

6. The apparatus of claim 5, wherein the support further comprises a bottom segment of the storage box supporting a rotatable support stand.

7. The apparatus of claim 6, wherein the rotatable support stand further comprises a pivot attachment to the hoist.

8. A hoist and a storage box combination comprising:

a support in the storage box for a hoist base;

wherein the support further comprises a rotatable support stand;

a swing arm attachable to the hoist base;

wherein the hoist base and swing arm are storable in the storage box;

said storage box having a mount to a vehicle frame to replace a rear bumper;

and wherein the swing arm further comprises a detachable mount to the hoist base.

9. The apparatus of claim 8, wherein the swing arm slides inside the hoist base in a collapsed mode.

10. The apparatus of claim 8, wherein the rotatable support stand has a pivot mount to the hoist base.

11. The apparatus of claim 8, wherein the storage box further comprises a drop leg functioning to support weight on the hoist.

12. The apparatus of claim 8, wherein the storage box further comprises a two-part top, a first part having a hinge to stay open when the hoist is erected, and a second part having a hinge to close when the hoist is erected.

13. The apparatus of claim 8, wherein the hoist has a first mount to secure a winch and a second mount to secure a come along.

14. The apparatus of claim 8, wherein the mount is a weld to a frame.

* * * * *